United States Patent [19]

Clouet

[11] Patent Number: 5,175,226

[45] Date of Patent: Dec. 29, 1992

[54] POLYDIORGANOSILOXANE/THIURAM DISULFIDE BLOCK COPOLYMERS AND RADICAL POLYMERIZATION OF VINYL MONOMERS THEREWITH

[75] Inventor: Gilbert Clouet, La Wantzenau, France

[73] Assignee: Rhone-Poulenc Chimie, Courbevoie, France

[21] Appl. No.: 508,601

[22] Filed: Apr. 13, 1990

[30] Foreign Application Priority Data

Apr. 13, 1989 [FR] France .................. 89 05178

[51] Int. Cl.⁵ ........................................ C08G 77/06
[52] U.S. Cl. ............................... 528/12; 528/25; 528/38; 528/21; 556/420
[58] Field of Search ........... 528/25, 38, 21, 12; 556/420

[56] References Cited

U.S. PATENT DOCUMENTS

| | | | |
|---|---|---|---|
| 2,762,826 | 9/1956 | Noll | 556/420 |
| 2,938,046 | 5/1960 | Morehouse | 556/420 |
| 4,046,795 | 9/1977 | Martin | 528/12 |
| 4,113,696 | 9/1978 | Williams | 260/448.2 B |
| 4,143,089 | 3/1979 | Martin | 528/25 |
| 4,584,356 | 4/1986 | Crivello et al. | 525/479 |
| 5,015,717 | 5/1991 | Martin et al. | 528/12 |
| 5,032,460 | 7/1991 | Kantner et al. | 528/12 |

OTHER PUBLICATIONS

Polymer, vol. 29, Oct. 1988, pp. 1909–1917, Butterworth & Co. (Publishers) Ltd.; C. P. Reghunadhan Nair et al.

Journal of Applied Polymer Science, vol. 29, No. 3, Mar. 29, 1984, pp. 877–889, New York—Inoue et al.

Primary Examiner—Melvyn I. Marquis
Assistant Examiner—Karen A. Hellender
Attorney, Agent, or Firm—Burns, Doane, Swecker & Mathis

[57] ABSTRACT

Polydiorganosiloxane/thiuram disulfide block copolymers having the formula:

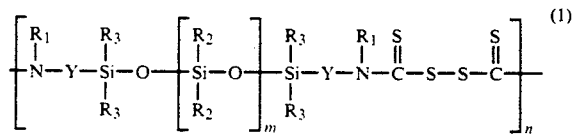

well adapted as "polyiniferters" in the radical polymerization of vinyl monomers, e.g., the (meth)acrylates or styrene, are prepared by reacting a corresponding α,ω-(amino)diorganopolysiloxane with $CS_2$ in the presence of a tertiary amine and an oxidizing agent, e.g., iodine.

4 Claims, No Drawings

POLYDIORGANOSILOXANE/THIURAM DISULFIDE BLOCK COPOLYMERS AND RADICAL POLYMERIZATION OF VINYL MONOMERS THEREWITH

BACKGROUND OF THE INVENTION

1. Field of the Invention

The present invention relates to novel polydiorganosiloxane/thiuram disulfide block copolymers, to a process for the preparation thereof, and to the use of such novel block copolymers in the radical polymerization of vinyl monomers to produce characteristic polydiorganosiloxane/polyvinyl block copolymers.

This invention especially relates to the industrial-scale production, strictly by radical polymerization process, of polydiorganosiloxane/polyvinyl block copolymers having a polydiorganosiloxane block at each end of the polymer chains.

2. Description of the Prior Art

The journal article, *Makromol. Chem. Rapid. Commun.*, 3, 127-132 (1982) describes the use of tetraalkylthiuram as an additive during the radical polymerization of vinyl monomers, such additive being designated an "iniferter" because during this polymerization it performs the triple function of free radical initiator, chain transfer agent and chain terminating agent.

The journal articles, *Polymer*, 29, 1909-1917, (1988) and *J. Macromol. Sci.-Chem.*, A 25(9), 1089-1126 (1988) describe polymeric "iniferters" based on poly(thiuram disulfide) bearing polyphosphonamide blocks.

These polymeric "iniferters", hereinafter deemed "polyiniferters", are prepared by the preliminary synthesis of a macrodiamine obtained, for example, by reacting the dichloride of phenylphosphonic acid with piperazine or N,N'-dimethyl-1,6-hexanediamine. The chain extension of this macrodiamine by a dithiocarbamylation reaction, followed by an oxidative coupling, gives a poly(thiuram disulfide) bearing the phosphonamide functional group. Thermal radical polymerization of methyl methacrylate or styrene in the presence of these "polyiniferters" results in the formation of polyvinyl/polyphosphonamide block copolymer.

SUMMARY OF THE INVENTION

A major object of the present invention is the provision of a novel "polyiniferter" which comprises a polydiorganosiloxane/thiuram disulfide block copolymer of the formula:

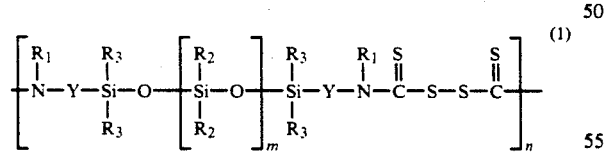

(1)

in which the symbols $R_1$, which may be identical or different, are each a monovalent organic radical selected from among a linear or branched $C_1$-$C_{12}$ alkyl radical optionally interrupted by an oxygen or nitrogen heteroatom and optionally substituted by a tertiary amine radical, a $C_3$-$C_8$ cycloalkyl radical, or an aryl, aralkyl and alkylaryl radical; the symbols Y, which may be identical or different, are each a divalent organic radical bonded to the silicon atom via an Si—C bond; the symbols $R_2$, which may be identical or different, are each a monovalent hydrocarbon radical selected from among a linear or branched $C_1$-$C_{12}$ alkyl radical, the 3,3,3-trifluoropropyl radical, or the phenyl radical; the symbols $R_3$, which may be identical or different, are each a radical $R_2$ or an alkoxy radical having from 1 to 8 carbon atoms; m is an integer ranging from 0 to 500, preferably from 2 to 200, inclusive; and n is an integer ranging from 2 to 100, inclusive, preferably from 7 to 25.

The copolymers of formula (1) are:

(i) either blocked at each end of the polymer chain by a monovalent block A':

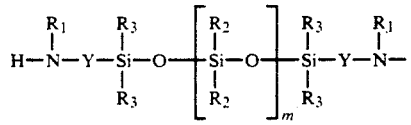

in which case they are represented by the formula:

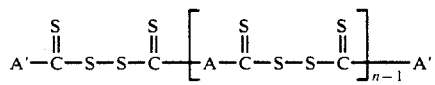

wherein A is the divalent block of the formula:

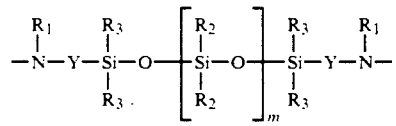

(ii) or are cyclized, in which case they are represented by the formula:

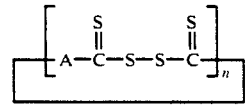

DETAILED DESCRIPTION OF THE PREFERRED EMBODIMENTS OF THE INVENTION

More particularly according to the present invention, the copolymers of formula (1) are advantageously prepared by reacting a polydiorganosiloxane of the formula:

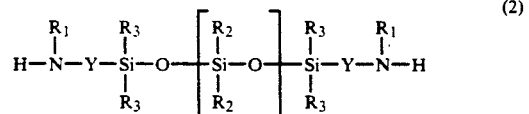

(2)

in which $R_1$, $R_2$, and $R_3$, Y and m are as defined as in formula (1) above, with carbon disulfide, in the presence of an oxidizing agent and of a tertiary amine.

For example, triethylamine and pyridine can be employed as the tertiary amine. Iodine can be employed as the oxidizing agent.

To provide a high value of n, ranging from approximately 10 to 100, it is recommended to employ a molar ratio of the polymer (2) to $CS_2$ of ½, in the presence of two moles of tertiary amine per mole of polymer (2).

If this molar ratio is slightly higher than ½, the value of n is low and ranges from 2 to 5.

The reaction is exothermic. Its exothermicity can be controlled by the usual means in this art.

The reaction can be carried out in a solvent medium or in bulk. In the latter case, the $CS_2$ can serve as the solvent.

The polydiorganosiloxane of formula (2) can be prepared, in particular, according to either of the following processes:

(a) according to a first process, where $R_3$ is identical with $R_2$, and wherein an α,ω-(dihydro)polydiorganosiloxane polymer of the formula:

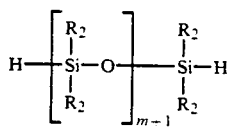  (3)

is reacted with an organic compound Comprising a secondary amine functional group and olefinic unsaturation, having the formula:

  (4)

in the presence of a catalytically effective amount of a catalyst based on platinum or based on a metal of the platinum group (rhodium, osmium, rhenium, and the like).

In formulae (3) and (4), the symbols $R_1$, $R_2$ and m have the same definitions as above and Y' is identical with Y, except that it also is olefinically unsaturated.

The platinum catalysts employed for carrying out the reaction of hydrosilylation of the polymers of formula (3) with the organic compound of formula (4) are extensively described in the literature; particularly representative thereof are chloroplatinic acid $H_2PtCl_6$, the complexes of platinum and of an organic product described in U.S. Pat. Nos. 3,159,601, 3,159,602 and 3,220,972 and European Patents EP-A-57,459, EP-A-188,978 and EP-A-190,530 and the complexes of platinum and of vinylated organopolysiloxane which are described in U.S. Pat. Nos. 3,419,593, 3,377,432 and 3,814,730.

To react the polymer containing SiH of formula (3) with the compound of formula (4), an amount of platinum catalyst is generally used, calculated as the weight of platinum metal, ranging from 5 to 600 ppm, preferably from 10 to 200 ppm, based on the weight of the polymer containing SiH of formula (3).

The hydrosilylation reaction can be carried out in bulk or in a volatile organic solvent such as toluene, heptane, xylene, tetrahydrofuran and tetrachloroethylene.

This reaction is preferably carried out in the absence of any aprotic solvent (for example water and alcohol).

It is generally desirable to heat the reaction mixture to a temperature ranging from 60° to 120° C. for that period of time required to complete the reaction. Furthermore, it is desirable to add the polymer containing SiH dropwise to the compound of formula (4), optionally in solution in an organic solvent.

The reaction is monitored to ensure that it is complete by determining the residual SiH groups using alcoholic potassium hydroxide and the solvent is then removed, for example by distillation under reduced pressure.

The functionalized polymer of formula (2) thus prepared can be purified, for example by being cascaded through a silica absorbent column.

Exemplary of the compounds of formula (4), particularly representative are the N-(monosubstituted)-allylamines of the formula:

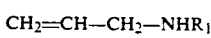

$CH_2=CH-CH_2-NHR_1$ wherein $R_1$ is preferably a methyl, ethyl, propyl, phenyl or cyclohexyl radical.

(b) According to a second process, where $R_3$ may additionally denote a hydrolyzable group selected from among alkoxy radicals having from 1 to 8 carbon atoms, an α,ω-(dihydroxy)polydiorganosiloxane polymer of the formula:

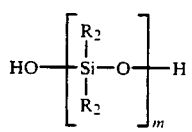  (5)

is reacted with an aminotrialkoxysilane of the formula:

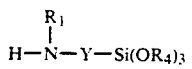  (6)

in which formulae the symbols $R_1$, $R_2$ and m are as defined above and the radicals $R_4$, which may be identical or different, are each a $C_1$-$C_8$ alkyl or alkoxyalkyl radical; $R_4$ is preferably methoxy or ethoxy.

The condensation reaction between the polymer (5) and the silane (6) is carried out at a temperature ranging from 40° to 140° C., preferably in a solvent medium, for a sufficient period of time to eliminate the amount of alcohol $R_4OH$ produced. Exemplary silanes of formula (6) are described, in particular, in U.S. Pat. Nos. 3,888,815, 4,481,364 and 4,556,722.

Representative silanes of formula (6) include the silanes of the formulae:

$(CH_3O)_3Si(CH_2)_3NHCH_3$

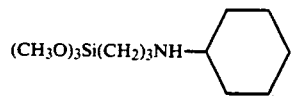

$(C_2H_5O)_3Si(CH_2)_3NHCH_3$
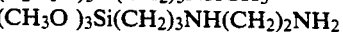
$(CH_3O)_3Si(CH_2)_3NH(CH_2)_2NH_2$
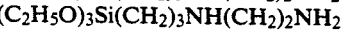
$(C_2H_5O)_3Si(CH_2)_3NH(CH_2)_2NH_2$
$(CH_3O)_3Si(CH_2)_4NHCH_3$
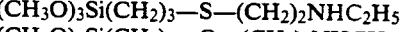
$(CH_3O)_3Si(CH_2)_3-S-(CH_2)_2NHC_2H_5$
$(CH_3O)_3Si(CH_2)_3-O-(CH_2)_2NHCH_3$
$(CH_3O)_3Si(CH_2)_3NH(CH_2)_2-S-CH_3$ In formulae (1) to (6) above, exemplary radicals $R_1$ are methyl, ethyl, propyl, butyl, 2-ethylhexyl, n-octyl, dodecyl, cyclopentyl, cyclobutyl, phenyl, benzyl and tolyl. In one embodiment, in the copolymer of formula (I), $R_1$ is methyl or cyclohexyl, $R_2$ is methyl and/or phenyl, Y is $-(CH_2)_3-$ and $R_3$ is methyl or $C_1$-$C_8$ alkoxy.

Y is preferably a linear or branched $C_1$-$C_8$, preferably $C_3$-$C_8$, alkylene radical, optionally interrupted by an oxygen or sulfur heteroatom.

Exemplary of the radicals Y, representative are: —$CH_2$—, —$(CH_2)_2$—, —$(CH_2)_3$—, $CH_2$—$CH(CH_3)$—$CH_2$—, —$(CH_2)_3$—O—$(CH_2)_2$—, —$(CH_2)_3$—S—$(CH_2)_2$— and —$(CH_2)_{12}$—.

The examples of alkyl radicals in the case of $R_2$ are the same as those given in the case of $R_1$; $R_1$ is preferably methyl or phenyl. Consequently, the diorganopolysiloxane block principally comprises recurring units selected from among dimethylsiloxy, methylphenylsiloxy and diphenylsiloxy.

Preferably, at least 50% of the number of the radicals $R_2$ are methyl radicals.

The present invention also features the use of the copolymer of formula (1) as a "polyiniferter" agent during the radical polymerization of vinyl monomers. It is advantageous to introduce the "polyiniferter" at the beginning of polymerization, with the mixture of vinyl monomers.

Particularly representative vinyl monomers which can thus be polymerized include:

(i) acrylic and methacrylic monomers, notably $C_1$-$C_{12}$ alkyl acrylates and methacrylates such as methyl methacrylate, ethyl methacrylate, isopropyl methacrylate and n-butyl methacrylate;

(ii) acrylic and methacrylic monomers bearing at least one hydroxyl group, such as hydroxyethyl methacrylate, hydroxypropyl methacrylate, diethylene glycol methacrylate, dipropylene glycol methacrylate, triethylene glycol methacrylate and the corresponding acrylates;

(iii) acrylamide and methacrylamide monomers; and (iv) styrene monomers such as styrene, α-methylstyrene, tert-butylstyrene and vinyltoluene.

Without wishing to limit the invention to any particular scientific theory, the radical reaction is believed to be carried out according to the following reaction scheme:

In the formula (7), p represents the degree of polymerization of the vinyl monomer and g the average number of polydiorganopolysiloxane/polyvinyl blocks per polymer chain; g typically ranges from 2 to 100, preferably from 2 to 10, and p typically ranges from 50 to 1,000, preferably from 50 to 300.

The polymerization reaction is advantageously carried out at a temperature of 50° to 160° C., preferably 60° to 90° C.

It is preferably carried out in bulk in the case where the "polyiniferter" is soluble in the vinyl monomer, as, for example, in the case of styrene and of methyl methacrylate. To the contrary, as for example in the case of acrylamide, a solvent, such as, for example, THF (tetrahydrofuran) is employed.

During the radical polymerization, the polyvinyl block is inserted between the two sulfurs of the thiuram group. The molecular weight of each of the polyvinyl blocks depends on the vinyl monomer/"polyiniferter" molar ratio.

The amount of "iniferter" introduced generally ranges from 1 to 50 parts by weight, preferably from 2 to 20 parts, per 100 parts by weight of vinyl monomer. When the amount of "polyiniferter" introduced is large, the polymerization rate decreases, the "polyiniferter" then principally serving as a terminating agent for the polymeric radicals.

Furthermore, at the time of polymerization it is possible to add an oxidizing agent such as $I_2$ to the reaction mixture constituted of the vinyl monomers, of the polymer of formula (2), of $CS_2$ and of the tertiary amine, for purposes of providing, in situ, an oxidizing-reducing system which makes it possible to lower the decomposition temperature of the diorganopolysiloxane/thiuram disulfide copolymer.

The diorganopolysiloxane/polyvinyl block copolymer always has chain ends which are diorganopolysiloxane blocks; the copolymer (7) can therefore also be represented by the formula:

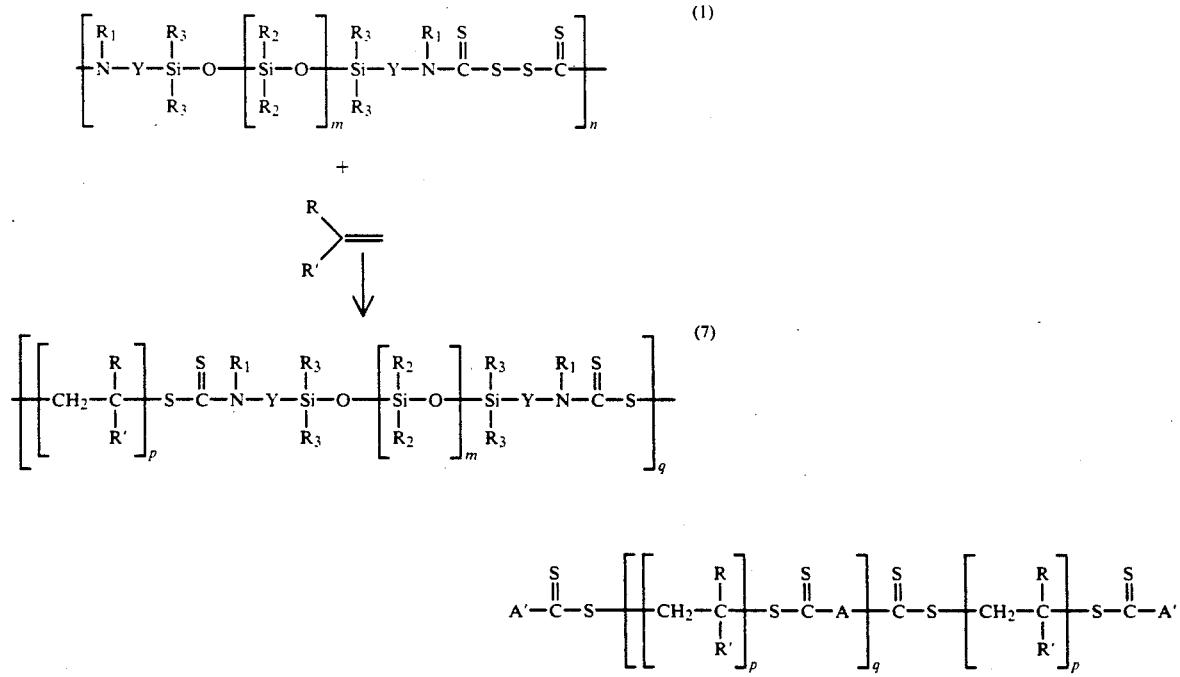

wherein R, R', A, A' and g are as defined or illustrated above.

By utilizing starting vinyl monomers such as styrene and acrylates and by employing the "polyiniferters" according to the invention, and by carrying out the copolymerization according to a high degree of conversion (for example ranging from 20 to 100%) of the vinyl monomers, it is possible to prepare copolymers which have a completely satisfactory polydispersity index. This of course is unexpected in the case of a radical polymerization characterized by a high degree of conversion. The copolymers formed using an acrylamide starting material are soluble or insoluble in water, depending on their silicon content, and may be employed as amphiphile polymers.

The process of copolymerization by a radical route according to the invention constitutes, therefore, a new route for synthesizing polydiorganosiloxane/polyvinyl block copolymers having a chemical structure which is well defined and thermally stable up to a temperature of 200° C. and even higher.

In order to further illustrate the present invention and the advantages thereof, the following specific examples are given, it being understood that same are intended only as illustrative and in nowise limitative.

In said examples to follow, the molecular weights of the polymers were measured by gas permeation chromatography (GPC employing a polystyrene or polymethyl methacrylate standard and tetrahydrofuran (THF) as eluent). Also in said examples to follow, as hereinbefore, all percentages and parts are given by weight, unless otherwise indicated.

EXAMPLE 1

Example 1(a): Preparation of the polydimethylsiloxane of the formula:

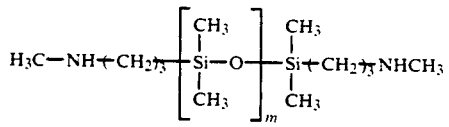

This polymer was prepared by adding 15 g of an α,ω-(dihydro)polydimethylsiloxane of the formula:

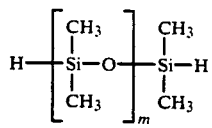

having a number-average molecular weight of 3,050, dropwise under argon to 1.5 ml of N-allylmethylamine, in the presence of 15 mg of chloroplatinic acid H$_2$PtCl$_6$ in an anhydrous medium and permitting these materials to react for 12 hours at 120° C.

Example 1(b): The operating procedure of Example 1(a) was repeated exactly, except that the starting material was an α,ω-(dihydro)polydimethylsiloxane oil having a number-average molecular weight of 400.

The final product had a number-average molecular weight of 625 and a functionality of 2.12.

Example 1(c): The operating procedure of Example 1(a) was repeated exactly, except that the starting material was an αω-(dihydro)polydimethylsiloxane oil having a number-average molecular weight of 1,090.

The final product obtained had a number-average molecular weight of 1,550 and a functionality of 1.82.

EXAMPLE 2

Synthesis of the poly(thiuram disulfide) of the formula:

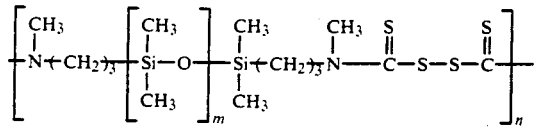

Example 2(a): 14 g of α,ω-bis(amino)polydimethylsiloxane prepared in Example 1(a) were dissolved in 50 ml of chloroform and cooled to 10° C. 2 ml of triethylamine were added, followed by 0.7 g of CS$_2$.

A solution of I$_2$ in CHCl$_3$ was added dropwise, under stirring, to the solution obtained, until the violet color persisted. The solution was washed with ice-cooled water, was dried over Na$_2$SO$_4$ for at least 24 hours and the final product was recovered in the form of a brown oil after removal of CHCl$_3$ by evaporation under reduced pressure at ambient temperature. In consideration of the amount of I$_2$ consumed and the percentage of nitrogen and of sulfur in the product obtained, it was concluded that the reaction was quantitative. The elemental analysis of the product obtained is reported in Table I below.

Example 2(b): The operating procedure of Example 2(a) was repeated exactly, except that the starting material employed was that of Example 1(b).

The elemental analysis of the product obtained is reported in Table I below.

Example 2(c): The operating procedure of Example 2(a) was repeated exactly, except that the starting material employed was that of Example 1(c).

The elemental analysis of the product obtained is reported in Table I below.

EXAMPLES 3 TO 11

Radical polymerization of a styrene monomer (Examples 3 to 7) or of a methyl methacrylate monomer (Examples 8 to 11) with the "polyiniferter" of Example 2(a):

Operating procedure: The polymerizations were carried out in a 100×140 mm sealed glass tube at a reduced pressure of 0.133 kPa. Since the "polyiniferter" was soluble in vinyl monomers, the reaction was carried out in bulk.

The contents of the tube were deaerated by at least three freezing, evacuating and thawing cycles.

The tube was then sealed at a pressure of 13.3 Pa.

The tube was immediately wrapped in aluminum foil and the polymerization was conducted in an oil bath at the required temperature for the desired period of time. After polymerization, the tube was withdrawn, was cooled in a mixture of dry ice and isopropanol and the polymer, diluted with tetrahydrofuran, was precipitated dropwise in methanol. The precipitate or the resinous product obtained was collected in a sintered glass crucible, was washed with petroleum ether, was dried at 45° C. overnight and was weighed.

Various polymerizations of styrene (Examples 3 to 7) or of methyl methacrylate (Examples 8 to 11) were carried out by varying the concentration [c] in grams of "polyiniferter" per liter of monomer, the temperature ($\theta$) and the polymerization time (t) in hours and min. The copolymer obtained was characterized by its number-average molecular weight $\overline{Mn}$, its weight-average molecular weight $\overline{Mw}$, the polydispersity index $Ip = \overline{Mw}:\overline{Mn}$, the average percentage of polydimethylsiloxane (D %), TF the degree of conversion of the vinyl monomers which was obtained at the end of reaction, and n the number of blocks of the formula:

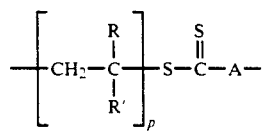

with n being calculated from the weight percentage of Si.

The results obtained are reported in Table II below.

Operating Procedure: The same operating procedure as in Examples 3 to 11 was employed, except that the polymerization reaction was carried out at 70° C. in solution in THF (tetrahydrofuran).

The copolymer formed precipitated in the reaction medium. It was filtered off, washed with THF and filtered off. The reaction conditions and the characterization of the copolymer formed are reported in Table IV below.

From Table IV, it will be seen that the solubility in water of the copolymer obtained depends on its polydimethylsiloxane content (D %); Table IV shows the concentration (M) of the acrylamide monomer in the reaction medium in moles per liter, the degree of conversion in % of the monomer at the end of reaction (T %), the concentration of the "polyiniferter" (PI) in g per 100 ml of reaction volume and the solubility of the copolymer obtained in water.

TABLE I

| POLY/THIURAM DISULFIDE OF EXAMPLE | C % | | H % | | N % | | S % | | Si % | |
|---|---|---|---|---|---|---|---|---|---|---|
| | calculated | found | calculated | found | calculated | found | calculated | found | calculated | found |
| 2(a) | 32.96 | 33.06 | 7.98 | 8.07 | 0.64 | 0.53 | 2.75 | 2.92 | 35.40 | 34.98 |
| 2(b) | 35.95 | 36.81 | 7.47 | 7.62 | 3.52 | 3.63 | 16.10 | 15.63 | 25.14 | 24.19 |
| 2(c) | 33.90 | 34.25 | 7.77 | 7.90 | 1.65 | 1.62 | 7.52 | 7.69 | 31.30 | 30.61 |

TABLE II

| Example | [C] g/l | $\Theta$ (°C.) | t (h) | (TF) (%) | $\overline{Mn}$ | $\overline{Mw}$ | IP | D (%) | n |
|---|---|---|---|---|---|---|---|---|---|
| 3 | 400 | 85 | 24 | 96 | 72,000 | 380,000 | 1.97 | 17.7 | 4 |
| 4 | 83 | 85 | 24 | 94 | 144,000 | 272,000 | 1.90 | 5.3 | 2.5 |
| 5 | 133 | 85 | 24 | 95 | 108,500 | 198,379 | 1.83 | 8.5 | 2.8 |
| 6 | 200 | 85 | 24 | 97 | 84,400 | 156,300 | 1.85 | 11 | 3 |
| 7 | 300 | 85 | 24 | 98 | 72,500 | 130,000 | 1.80 | 15 | 3.5 |
| 8 | 200 | 85 | 24 | 97 | 90,000 | 184,000 | 2 | 7.4 | 2.2 |
| 9 | 300 | 85 | 24 | 91 | 77,000 | 157,000 | 2 | 8.1 | 2.5 |
| 10 | 400 | 85 | 24 | 99 | 67,000 | 127,000 | 1.8 | 9.5 | 2.7 |
| 11 | 84 | 85 | 24 | 95 | 103,000 | 323,000 | 3 | 4.2 | 2.1 |

TABLE III

| Example | [C] g/l | $\Theta$ (°C.) | t (h) | (T) (%) | $\overline{Mn} \times 10^{-4}$ | $\overline{Mw} \times 10^{-4}$ | IP | D (%) | n |
|---|---|---|---|---|---|---|---|---|---|
| 12 | 80 | 90 | 1.5 | 17.8 | 10.7 | 27 | 2.5 | 8.6 | 5.60 |
| 13 | 80 | 90 | 3 | 33.0 | 11.7 | 31.5 | 2.7 | 8.4 | 6.20 |
| 14 | 80 | 90 | 5 | 49.6 | 8.6 | 24 | 2.8 | 7.4 | 7.10 |
| 15 | 80 | 90 | 9.5 | 71.0 | 13.5 | 37.5 | 2.8 | 6.3 | 8.60 |
| 16 | 100 | 85 | 1.5 | 7.5 | 4.6 | 16.3 | 3.5 | 10.9 | 2.00 |
| 17 | 100 | 85 | 3.5 | 20 | 6.4 | 25.9 | 4.0 | 8.1 | 2.38 |
| 18 | 100 | 85 | 6 | 40 | 8 | 21 | 2.6 | 6.6 | 2.45 |
| 19 | 100 | 85 | 8.5 | 64 | 10.3 | 32.3 | 3.1 | 4.3 | 2.81 |

EXAMPLES 12 TO 19

The operating procedure of Examples 3 to 11 was repeated exactly, except that the starting material of Example 2(a) was replaced with the starting material of Example 2(c).

Examples 12 to 15 relate to styrene polymerization and Examples 16 to 19 relate to methyl methacrylate polymerization.

The results obtained are reported in Table III below.

EXAMPLES 20 TO 27

Radical polymerization of an acrylamide monomer with the "polyiniferter" of Example 2(b) (Examples 20 to 26) and 2(c) (Examples 26 and 27):

TABLE IV

| Example | [M] | T % | [PI] | D (%) | Solubility in water |
|---|---|---|---|---|---|
| 20 | 2.11 | 20 | 0.25 | 0.90 | soluble |
| 21 | 2.11 | 18.6 | 0.5 | 1.11 | soluble |
| 22 | 2.11 | 21 | 1.0 | 2.11 | swelling |
| 23 | 2.11 | 15 | 1 | 5.76 | insoluble |
| 24 | 2.11 | 19 | 2.0 | 7.10 | insoluble |
| 25 | 2.11 | 12 | 2.5* | 17.80 | insoluble |
| 26 | 1.88 | 14.5 | 1.5 | 2.90 | soluble |
| 27 | 1.88 | 8.0 | 2.76 | 5.23 | soluble after swelling |

*reaction temperature 80° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A polydiorganosiloxane/thiuram disulfide block copolymer having the formula:

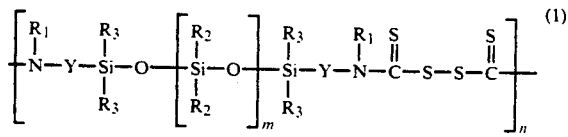 (1)

in which the symbols $R_1$, which may be identical or different, are each a linear or branched $C_1$-$C_2$ alkyl radical optionally interrupted by an oxygen or nitrogen heteroatom and optionally substituted by a tertiary amine group, a $C_3$-$C_8$ cycloalkyl radical, or an aryl, aralkyl or alkylaryl radical; the symbols Y, which may be identical or different, are each a divalent organic radical bonded to the silicon atom via an Si—C bond; the symbols $R_2$, which may be identical or different, are each a linear or branched $C_1$-$C_{12}$ alkyl radical, a 3,3,3-trifluoropropyl radical, or a phenyl radical; the symbols $R_3$, which may be identical or different, are each a radical $R_2$ or an alkoxy radical having from 1 to 8 carbon atoms; m is an integer ranging from 0 to 500; and n is an integer ranging from 2 to 100.

2. The copolymer as defined by claim 1, wherein formula (1) $R_1$ is methyl or cyclohexyl, $R_2$ is methyl and/or phenyl, Y is —(CH$_2$)$_3$— and $R_3$ is methyl or $C_1$-$C_8$ alkoxy.

3. A process for the preparation of a copolymer as defined by claim 1, comprising reacting a polydiorganosiloxane of the formula:

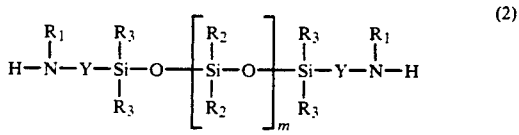 (2)

with carbon disulfide, in the presence of an oxidizing agent and a tertiary amine wherein $R_1$, $R_2$, $R_3$, m and Y are as defined in claim 2.

4. The process as defined by claim 3, wherein said oxidizing agent comprises iodine and said tertiary amine comprises triethylamine.

* * * * *